United States Patent [19]
Hartrick et al.

[11] Patent Number: 5,532,920
[45] Date of Patent: Jul. 2, 1996

[54] DATA PROCESSING SYSTEM AND METHOD TO ENFORCE PAYMENT OF ROYALTIES WHEN COPYING SOFTCOPY BOOKS

[75] Inventors: Thomas V. Hartrick; Jeffrey N. Stevens, both of Gaithersburg; Nicholas J. Sabia, Silver Spring, all of Md.

[73] Assignee: International Business Machines Corporation, Armonk, N.Y.

[21] Appl. No.: 365,980

[22] Filed: Dec. 28, 1994

Related U.S. Application Data

[63] Continuation of Ser. No. 875,919, Apr. 29, 1992.

[51] Int. Cl.⁶ .............................. G06F 3/14; G06F 17/21; G09C 3/00; G09C 5/00
[52] U.S. Cl. ...................... 364/419.1; 395/144; 395/145; 380/3; 380/55
[58] Field of Search ........................ 340/825.31, 825.33, 340/825.34, 825.35; 364/419.19, 478, 479, 419.1, 401; 379/88, 89; 380/4, 25, 3, 55; 395/144, 148, 147

[56] References Cited

U.S. PATENT DOCUMENTS

| | | | |
|---|---|---|---|
| 4,179,212 | 12/1979 | Lahr | 355/202 |
| 4,528,643 | 7/1985 | Freeny, Jr. | 364/468 |
| 4,677,434 | 6/1987 | Fascenda | 380/23 |
| 4,685,055 | 8/1987 | Thomas | 380/4 |
| 4,723,284 | 2/1988 | Munck et al. | 380/25 |
| 4,740,890 | 4/1988 | William . | |
| 4,780,821 | 10/1988 | Crossley . | |
| 4,791,565 | 12/1988 | Dunham et al. . | |
| 4,796,181 | 1/1989 | Wiedemer | 364/406 |
| 4,803,643 | 2/1989 | Hickey | 395/147 |
| 4,827,508 | 5/1989 | Shear | 380/4 |
| 4,908,873 | 3/1990 | Philibert et al. | 382/100 |
| 4,937,863 | 6/1990 | Robert et al. | 380/4 |
| 4,965,680 | 10/1990 | Endoh | 360/60 |
| 5,005,122 | 4/1991 | Griffin et al. . | |
| 5,099,426 | 3/1992 | Carlgren et al. | 364/419.13 |
| 5,146,552 | 9/1992 | Cassorla et al. | 395/145 |
| 5,204,897 | 4/1993 | Wyman | 380/4 |
| 5,214,696 | 5/1993 | Keiser, II et al. | 380/4 |
| 5,247,575 | 9/1993 | Sprague et al. | 380/9 |
| 5,428,529 | 6/1995 | Hatrick et al. | 364/419.1 |

FOREIGN PATENT DOCUMENTS

0464306A3  2/1991  European Pat. Off. .......... G06F 1/00

OTHER PUBLICATIONS

Taylor, "The Potential of On–Demand Printing: Digital Equipment Computer Co. is a Trailblazer for the New Technology"; *Publishers Weekly;* v238 n25; p38(3); Jun. 7, 1991; Dialog: File 148, Acc#05195397.

Basch; "Books Online: Visioins, Plans and Perspectives for Electonic Text"; *Online;* v15 n4; p13(11); Jul. 1991; Dialog: File 148, Acc#05399741.

J. C. Tanner, et al., "Legally Operating and Tracking Software in a LAN Environment," *Technical Disclosure Bulletin,* Mar. 1991, pp. 291–292.

R. A. Feigel, "Protection of Licensed Software Applications in a Network Environment,"*Technical Disclosure Bulletin,* Feb. 1988, pp. 37–38.

*Primary Examiner*—Donald E. McElheny, Jr.
*Assistant Examiner*—Stephen R. Tkacs
*Attorney, Agent, or Firm*—Edward H. Duffield; John E. Jobe

[57] ABSTRACT

A publisher of a softcopy book includes royalty payment information either within the structured document text of the book or in a royalty payment information file which accompanies the book. To read the book from the storage disk, the user applies a special softcopy book reading program at his workstation. If the user enters a command to copy the book onto a writable storage medium such as a magnetic disk or to print a hardcopy of the book with a printer or to transmit a copy of the book over a modem, a royalty payment program intercepts the copying command and suspends the copying operations. Instead, the royalty payment program presents the user with a display of the royalty payment information stored in the book text or in a file accompanying the book. The user must select the option of paying a royalty to the publisher before the royalty payment program permits a copy of the book to be made.

30 Claims, 17 Drawing Sheets

FIG. 3A

EXAMPLE OF CONTROL ELEMENT TAGS
AND ASSOCIATED TEXT

[cpr] (C) Copyright Jefferson & Co. 1776 [/cpr] ←— copyright 40
[p]We hold these truths to be self-evident, that
all men are created equal, that they are endowed by ←— paragraph 28
their creator with certain unalienable Rights, that
among these are[/p]
[list]
    [li]Life,[/li] ←— 32
    [li]Liberty and[/li] ←— 34   list 30
    [li]the pursuit of Happiness.[/li] ←— 36
[/list]
[p]That to secure these rights, Governments are
instituted among Men, deriving their just powers ←— paragraph 38
from the consent of the governed.[/p]
[royalty] Book Reproduction Fee [royalty] ←— royalty 306
[amount] $20.00 [/amount] ←— amount 308

Memory Image of Formatted Text and Element Coordinates

Formatted Text Stream 25 coordinates /156

| | | bk | h1 | h2 | h3 | p | el |
|---|---|---|---|---|---|---|---|
| 300 | [bk] Book Title [/bk] | 1 | 0 | 0 | 0 | 0 | 1 |
| 302 | [ed] Second Edition [/ed] | 1 | 0 | 0 | 0 | 1 | 1 |
| 304 | [cpr] (C) ABC Co 1990 [/cpr] | 1 | 0 | 0 | 0 | 2 | 1 |
| 306 | [royalty] Book Reproduction Fee [/royalty] | 1 | 0 | 0 | 0 | 3 | 1 |
| 308 | [amount] $20.00 [/amount] | 1 | 0 | 0 | 0 | 3 | 2 |
| 310 | [phone] 1-800-123-1234 [/phone] | 1 | 0 | 0 | 0 | 3 | 3 |
| 312 | [public key] 13A723F9...6 [/public key] | 1 | 0 | 0 | 0 | 3 | 4 |
| 314 | [validation] The Book Repro Fee Is Paid [/validation] | 1 | 0 | 0 | 0 | 3 | 5 |
| 316 | [h1] First Chapter Heading [/h1] | 1 | 1 | 0 | 0 | 0 | 1 |
| 318 | [royalty] Chapter Reproduction Fee [/royalty] | 1 | 1 | 0 | 0 | 1 | 1 |
| 320 | [amount] $ 1.00 [/amount] | 1 | 1 | 0 | 0 | 1 | 2 |
| 322 | [validation] First Chapter Fee Paid [/validation] | 1 | 1 | 0 | 0 | 1 | 3 |
| 324 | [p] Paragraph of text [/p] | 1 | 1 | 0 | 0 | 2 | 1 |

FIG. 4

| FIG. 4A |
|---|
| FIG. 4B |

| | | | | | |
|---|---|---|---|---|---|
| 326 / [h2] First topic heading [/h2] | 1 | 1 | 1 | 0 | 1 |
| 328 / [p] Paragraph of text [/p] | 1 | 1 | 1 | 0 | 1 |
| 330 / [p] Paragraph of text [/p] | 1 | 1 | 1 | 0 | 2 | 1 |
| 332 / [h2] Second topic heading [/h2] | 1 | 1 | 2 | 0 | 0 | 1 |
| 334 / [p] Paragraph of text [/p] | 1 | 1 | 2 | 0 | 1 | 1 |
| 336 / [h3] First subtopic heading [/h3] | 1 | 1 | 2 | 1 | 0 | 1 |
| 338 / [p] Paragraph of text [/p] | 1 | 1 | 2 | 1 | 1 | 1 |
| 340 / [p] Paragraph of text [/p] | 1 | 1 | 2 | 1 | 2 | 1 |
| 342 / [h1] Second Chapter Heading [/h1] | 1 | 2 | 0 | 0 | 0 | 1 |
| 344 / [royalty] Chapter Reproduction Fee [/royalty] | 1 | 2 | 0 | 0 | 1 | 1 |
| 346 / [amount] $ 2.00 [/amount] | 1 | 2 | 0 | 0 | 1 | 2 |
| 348 / [validation] Second Chapter Fee Paid [/validation] | 1 | 2 | 0 | 0 | 1 | 3 |
| 350 / [p] Paragraph of text [/p] | 1 | 2 | 0 | 0 | 2 | 1 |

22 / Memory

Display of Text from Fig. 4

| | |
|---|---|
| 300 → | Book Title |
| 302 → | Second Edition |
| 304 → | (C) ABC Co 1990 |
| 306 → | Book Reproduction Fee |
| 308 → | $20.00 |
| 310 → | 1-800-123-1234 |
| 316 → | First Chapter Heading |
| 318 → | Chapter Reproduction Fee |
| 320 → | $ 1.00 |
| 324 → | Paragraph of text |
| 326 → | First topic heading |
| 328 → | Paragraph of text |
| 330 → | Paragraph of text |
| 332 → | Second topic heading |
| 334 → | Paragraph of text |
| 336 → | First subtopic heading |
| 338 → | Paragraph of text |
| 340 → | Paragraph of text |
| 342 → | Second Chapter Heading |
| 344 → | Chapter Reproduction Fee |
| 346 → | $ 2.00 |
| 350 → | Paragraph of text |

26 Display

FIG. 6

Initially Unloaded Parameter Table 56

| | Special Tags 360 | Text String Loaded from Elements with Special Tags 362 | Element Coordinates bk h1 h2 h3 p el 156 | Display Text 364 | Book Royalty Flag 366 | Chapter Royalty Flag 368 |
|---|---|---|---|---|---|---|
| 300I | bk | | | yes | | |
| 302I | ed | | | yes | | |
| 304I | cpr | | | yes | | |
| 306I | royalty | | | yes | | |
| 308I | amount | | | yes | | |
| 310I | phone | | | yes | | |
| 312I | public key | | | no | | |
| 314I | validation | | | no | | |

FIG. 7

Loaded Parameter Table 56L / 360

| | Special Tags | Text String Loaded from Elements with Special Tags / 362 | Element Coordinates 156 bk h1 h2 h3 p el | Display Text / 364 | Book Royalty Flag / 366 | Chapter Royalty Flag / 368 |
|---|---|---|---|---|---|---|
| 300L | bk | Book Title | 1 0 0 0 0 1 | yes | | |
| 302L | ed | Second Edition | 1 0 0 0 1 1 | yes | | |
| 304L | cpr | (C) ABC Co. 1990 | 1 0 0 0 2 1 | yes | | |
| 306L | royalty | Book Repro...Fee | 1 0 0 0 3 1 | yes | x | |
| 308L | amount | $20.00 | 1 0 0 0 3 2 | yes | | |
| 310L | phone | 1-800-123-1234 | 1 0 0 0 3 3 | yes | | |
| 312L | public key | 13A723F9...6 | 1 0 0 0 3 4 | no | | |
| 314L | validation | The Book ... Paid | 1 0 0 0 3 5 | no | | |
| 318L | royalty | Chapt...Repro Fee | 1 1 0 0 1 1 | yes | | x |
| 320L | amount | $1.00 | 1 1 0 0 1 2 | yes | | |
| 322L | validation | First Chapt ... Paid | 1 1 0 0 1 3 | no | | |
| 344L | royalty | Chapt ... Repro Fee | 1 2 0 0 1 1 | yes | | x |
| 346L | amount | $2.00 | 1 2 0 0 1 2 | yes | | |
| 348L | validation | Second Chapt ... Paid | 1 2 0 0 1 3 | no | | |

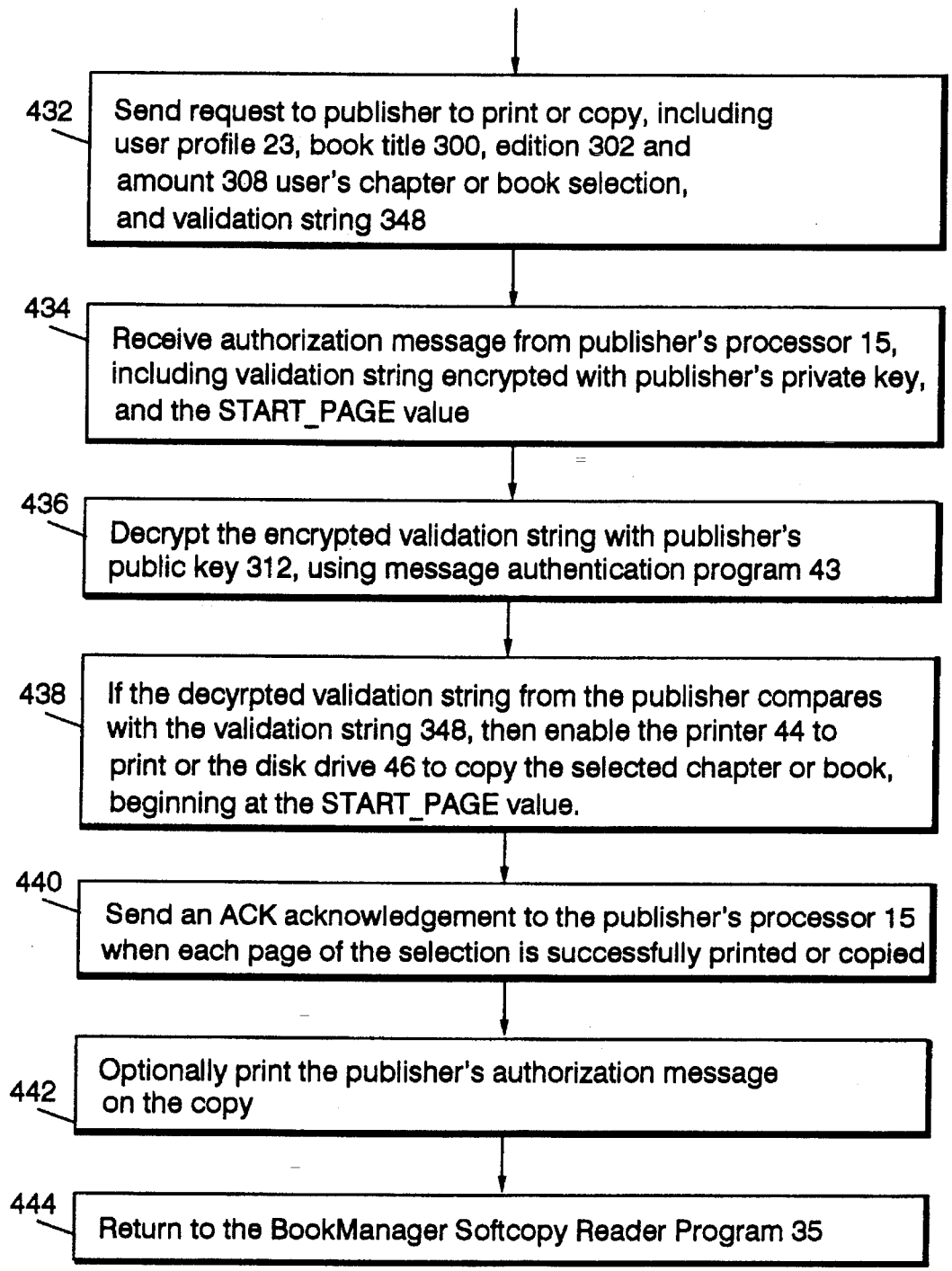

FIG. 11

Display of Prompt to User

Reproduction Fees

For Current Chapter Being Viewed

342 → Second Chapter Heading     Type "X" in box

344 → Chapter Reproduction Fee

346 → $ 2.00

Reproduction Fees

For The Entire Book Being Viewed

300 → Book Title     Type "X" in box

302 → Second Edition

306 → Book Reproduction Fee

308 → $ 20.00

310 → Enter Your Selection and Then Call 1-800-123-1234

The amount you select will be billed
to the credit card number in your profile.

26
Display

DATA PROCESSING SYSTEM AND METHOD TO ENFORCE PAYMENT OF ROYALTIES WHEN COPYING SOFTCOPY BOOKS

This application is a continuation of U.S. patent application No. 07/875,919, now abandoned, filed Apr. 29, 1992.

BACKGROUND OF THE INVENTION

1. Technical Field

The invention disclosed broadly relates to data processing and more particularly relates to the management of copying and printing operations for a softcopy document by a data processor, so as to comply with royalty payment requirements for making copies of the document.

2. Background Art

Modern word processing and text editing programs employ structured document architecture to provide greater control and flexibility in the displayed and printed appearance of documents prepared with the programs. Structured document architecture is described, for example, in the copending U.S. patent application Ser. No. 344,332, filed Apr. 26, 1989, entitled "A Method for Manipulating Elements Within a Structured Document Using Active Intent Interpretation," by C. J. Bennett, D. A. Foulger, E. M. Hesse and D. W. Walsh, assigned to the IBM Corporation and incorporated herein by reference. A structured document can be prepared in accordance with the standardized general markup language, such as is described in the International Standard's Organization Standard 8879–1986. A data stream of text marked up in accordance with the standardized general markup language, will have its text divided into elements consisting of a begin tag and its content and terminated by an end tag, when necessary. Within a WYSIWYG (what you see is what you get) editor, text is displayed to the user as it will appear when it is printed, even though its structure is defined by the begin tags and end tags for each element of text. Formatting of the elements within a structured document is done when the document is displayed to the user. Those elements which fall into the category of commonly used elements include paragraphs, simple lists, ordered lists, bulleted lists, and list items.

Large documents marked up with structured document architecture tags, can be manipulated as a softcopy book, by the method described in the copending U.S. patent application Ser. No. 486,461, filed February 28, 1990, now U.S. Pat. No. 5,146,552, entitled "Method for Associating Annotation With Electronically Published Material" by J. P. DeVries, J. J. Slater, M. E. Moran, J. Unger and E. Cassorla, assigned to the IBM Corporation and incorporated herein by reference. The Cassorla, et al. patent describes a method for creating on-line softcopy books from the same marked up source material used to create printed information such as a word processor or a markup language source used with a text formatter. A book data stream is provided, in an intermediate format for storing on-line information, specifically designed to be used by a book display program. The data stream captures and preserves structural information about the books, by using the structured document tags. The method is suited to display on-line softcopy books in a useable manner on a variety of display devices. A book display program manipulates the book data stream and allows users to interact with the on-line information. The electronic book may be used like a hard copy book, except that it is displayed on a display screen. The method allows readers to treat on-line softcopy books as if they were hard copy books, and uses the book data stream as its input.

The book data stream is created by a special softcopy book building program which processes the marked source material by performing a word frequency analysis to form compact data tokens which represent the words in the book. The compacted, tokenized text is then stored as the book data stream on a storage disk such as a compact optical disk. To read the book data stream from the storage disk, a special softcopy book reading program, reconverts the compacted, tokenized text into the marked source material, which is then capable of being displayed on a display device, copied as an ASCII file onto other storage disks, printed on a hardcopy printer or transmitted over a modem to other data processors. The process for converting the marked source material to the book data stream is described in the U.S. Pat. No. 5,099,426 by R. G. Carlgren and W. D. Modlin, entitled "Method for Use of Morphological Information to Cross Reference Keywords Used for Information Retrieval", assigned to the IBM Corporation and incorporated herein by reference.

The special softcopy book reading program has been embodied in the IBM BookManager (TM) READ program, which helps the user manage, search and look at on-line books. There are two complementary BookManager products, BookManager BUILE is the special softcopy book building program, which creates on-line books from files marked-up with Generalized Markup Language. The BookManager READ product can then manage, search and show the on-line books created by BookManager BUILD. The BookManager READ program product is described in the IBM publication "BookManager (TM) READ, Displaying On-Line Books," publication number SC23-0449-0, February 1989. The BookManager BUILD program product is described in the IBM publication "BookManager (TM) BUILD -Preparing On-Line Books," publication number SC23-0450-0, February 1989. These publications are available from IBM branch offices.

The BookManager BUILD and BookManager READ program products use on-line, softcopy books which are formatted using the Generalized Markup Language (GML) described in the following two IBM publications: "IBM BookMaster—Text Programmers Notebook—Release 3.0," publication number SC34-5012-02, September 1990 and "IBM BookMaster—Users Guide —Release 3.0," publication number SC34-5009-03, September 1990. Both of these IBM BookMaster publications are available through IBM branch offices.

Softcopy books are frequently communicated, stored, displayed and modified in their softcopy form, with hard copies only occasionally made. Authors of such electronic books or documents frequently desire to impose appropriate forms of security treatment for the electronic books so generated and they wish to have any rights of authorship in their works, respected. This is provided by the invention described in the copending U.S. patent application Ser. No. 546,334, filed Jun. 29, 1990, now U.S. Pat. No. 5,428,529, entitled "Structured Document Tags Invoking Specialized Functions" by T. V. Hartrick, P. E. Higgins and N. J. Sabia, assigned to the IBM Corporation and incorporated herein by reference. The Hartrick, et al. patent application describes a means to enforce the author's intentions for the treatment of his electronic books or documents. The author may place a copyright notice on his softcopy documents, and the mechanism increases the prominence of that notice. Security labels such as "Company Confidential," "Do Not Copy," or "Do Not Distribute," which the author may place on the softcopy of the document, are enforced by limiting or preventing copying.

The invention disclosed by Hartrick, et al. is employed to place a special copyright notice on the first page of the displayed document as it is displayed on the display device. A special structured document tag for copyright which accompanies the copyright notice character string can be located anywhere in the structured document's formatted text stream. This is referred to as a global tag. If a printer is connected to the system and commanded to print the document, a cover page can be selectively printed which includes the copyright notice, before the rest of the structured document is printed by the printer.

Another feature disclosed by Hartrick, et al. is placement of a special "Do Not Copy" label on pages of the document as it is displayed. A special structured document tag accompanies the "Do Not Copy" label in the structured document. Its presence will cause the "Do Not Copy" string, to be selectively displayed on all pages when the document is displayed on the display device. Still further, if a printer connected to the system is commanded to print the document, the printing operation will be aborted in response to the presence of the special structured document tag for the "Do Not Copy" label. Still further, if a disk drive storage device is connected to the system, a write to disk command for the document will be aborted in response to the special structured document tag for the "Do Not Copy" label. Still further, if a communications adapter is connected to the system, a transmission command for the document will have its function aborted in response to the special structured document tag for the "Do Not Copy" label.

Authors, of course, are in the business of authoring to make money. And this motivation is not different for those authors and their publishers who have chosen the medium of softcopy books for their publications. What is needed is a means to enforce the payment of royalties to publishers and authors of softcopy books, when a reader desires to make a copy of a portion or all of the book.

Terminology

The following terminology is used in this description, in referring to structured document architecture concepts.

SGML

Standardized General Markup Language. A markup language consisting of tags used to prepare structured documents. Refer to International Standards Organization standard 8879-1986 for definition and details.

Structured Document

A document prepared in accordance with an SGML-compliant type definition.

Element

SGML-defined entity consisting of a begin tag and its alphanumeric string content, and including an end tag, when necessary.

Empty Element

An element whose contents are null, containing neither text nor other elements.

Current document position

The document position which determines the current page for display.

Commonly Used Elements

Those elements which fall into the category of commonly used elements include Paragraphs, Simple Lists, Ordered Lists, Bulleted Lists and List Items.

Tag Name

The name given to a set of elements which all abide by the same rules of formatting. Examples of a tag name include PARAGRAPH, SIMPLE LIST, and LIST ITEM.

Formatted Text Stream

The formatted text stream is the sequence of alphanumeric characters which includes the structured document tags and associated text for the elements comprising the structured document.

OBJECTS OF THE INVENTION

It is therefore an object of the invention to provide an improved method for managing the soft copy text of a structured document in a data processing system, so as to comply with royalty payment requirements of the document.

It is still a further object of the invention to provide an improved method for managing the printing of pages of a structured document, so as to comply with royalty payment requirements of the document.

It is yet another object of the invention to provide an improved method for managing the writing of a structured document into a bulk storage medium, so as to comply with royalty payment requirements of the document.

It is yet a further object of the invention to provide an improved method for managing the telecommunication of soft copies of a structured document, so as to comply with royalty payment requirements of the document.

SUMMARY OF THE INVENTION

The author or publisher of a softcopy book specifies the royalty amount he wants to be paid by users who copy the book or individual chapters of the book. The source text of the book has the form of the structured document, formatted text stream.

In accordance with the invention, the publisher includes royalty payment information either within the structured document text of the book or in a royalty payment information file which accompanies the book. The publisher then writes a copy of the book onto a compact disk optical storage medium, a floppy disk magnetic storage medium, or other suitable storage medium. The book is stored on the storage medium as a compacted, tokenized text.

To read the book from the storage disk, the user applies a special softcopy book reading program at his workstation, which reconverts the compacted, tokenized text into the structured document source text, which is then capable of being displayed on a display device.

In accordance with the invention, the user also applies a royalty payment program in conjunction with the softcopy book reading program. If the user enters a command to copy the book onto a writable storage medium such as a magnetic disk or to print a hardcopy of the book with a printer or to transmit a copy of the book over a modem, the royalty payment program intercepts the copying command and suspends the copying operations. Instead, the royalty payment program presents the user with a display of the royalty payment information stored in the book text or in a file accompanying the book. The user must select the option of paying a royalty to the publisher before the royalty payment program permits a copy of the book to be made.

The royalty payment information contained in the structured document text of the softcopy book or in the royalty information file accompanying the softcopy book, can include royalty payment information on individual chapters of the book, as well as on the entire book. If the user is displaying a particular chapter of the book at his workstation at the time he enters the copying command, the royalty payment program displays royalty payment information for the current chapter being displayed, as well as that for the entire book.

When the user selects to pay the royalty, a communication session is established between the user's workstation and the publisher's data processor, for example by placing a call through a modem and over the public telephone network. A message is sent by the royalty payment program to the publisher's data processor, requesting that the user be permitted to make a copy of a specified part of the book or of the entire book. The request message includes the user's name, his mailing address, and his credit card number or other billing information. The message also contains enough information about the book so that the publisher's data processor can compute the royalty amount the user is to pay.

After checking that the user's offered mode of payment is effective, the publisher's data processor sends back to the user's royalty payment program, an authorization message to make the proposed copy. The royalty payment program in the user's workstation then recommences the copying operation which was suspended, allowing the proposed copy of the book to be made.

The publisher's data processor records the request by the user to make the copy of the book, and prepares a bill to the user's credit card account.

The authorization message sent by the publisher's data processor in response to the user's request, can contain authentication data which is used by the royalty payment program in the user's workstation to authenticate the authorization message from the publisher. This prevents the user or others from circumventing the royalty payment process.

In accordance with the invention, the authorization message may also contain starting page data which is used in the recovery of aborted copying sessions by the user. As the user is making the proposed copy, an acknowledgement signal is periodically sent from the user's workstation to the publisher's data processor. This is done for each page or chapter successfully copied by the user. The publisher's data processor counts the acknowledgement signals. If the user's copying of the book fails before the proposed copying is completed, then the publisher's data processor stores a fault record with the number of the last page or chapter of the book which was successfully copied. This is indicated by the number of acknowledgement signals received by the publisher. Later, when the user reconnects his workstation with the publisher's data processor and makes another request to copy the book, a new authorization message is sent by the publisher to the user, with the identity of the last page or chapter successfully copied. If the user does not reconnect to the publisher, then the publisher's data processor will bill the user for only the portion of the book which was successfully copied.

The resulting invention provides an improved means to enforce the payment of royalties to publishers and authors of softcopy books, when a reader desires to make a copy of a portion or all of the book.

BRIEF DESCRIPTION OF THE DRAWINGS

These and other objects, features and advantages of the invention will be more fully appreciated with reference to the accompanying figures.

FIG. 3A is a first example of element tags and associated text.

FIG. 4 is a more detailed diagram of the memory image for a second example of the formatted text stream 25, showing in particular the element coordinates 156 associated with each particular element in the formatted text stream.

FIG. 5 illustrates the appearance of the display of text for the second example of FIGS. 4.

FIG. 6 is a diagram of the initially unloaded parameter table 56.

FIGS. 8 and 8A show a flow diagram of the royalty payment program 45.

FIG. 11 shows the display of royalty payment information at the user's workstation.

DESCRIPTION OF THE BEST MODE FOR CARRYING OUT THE INVENTION

Figure 1:
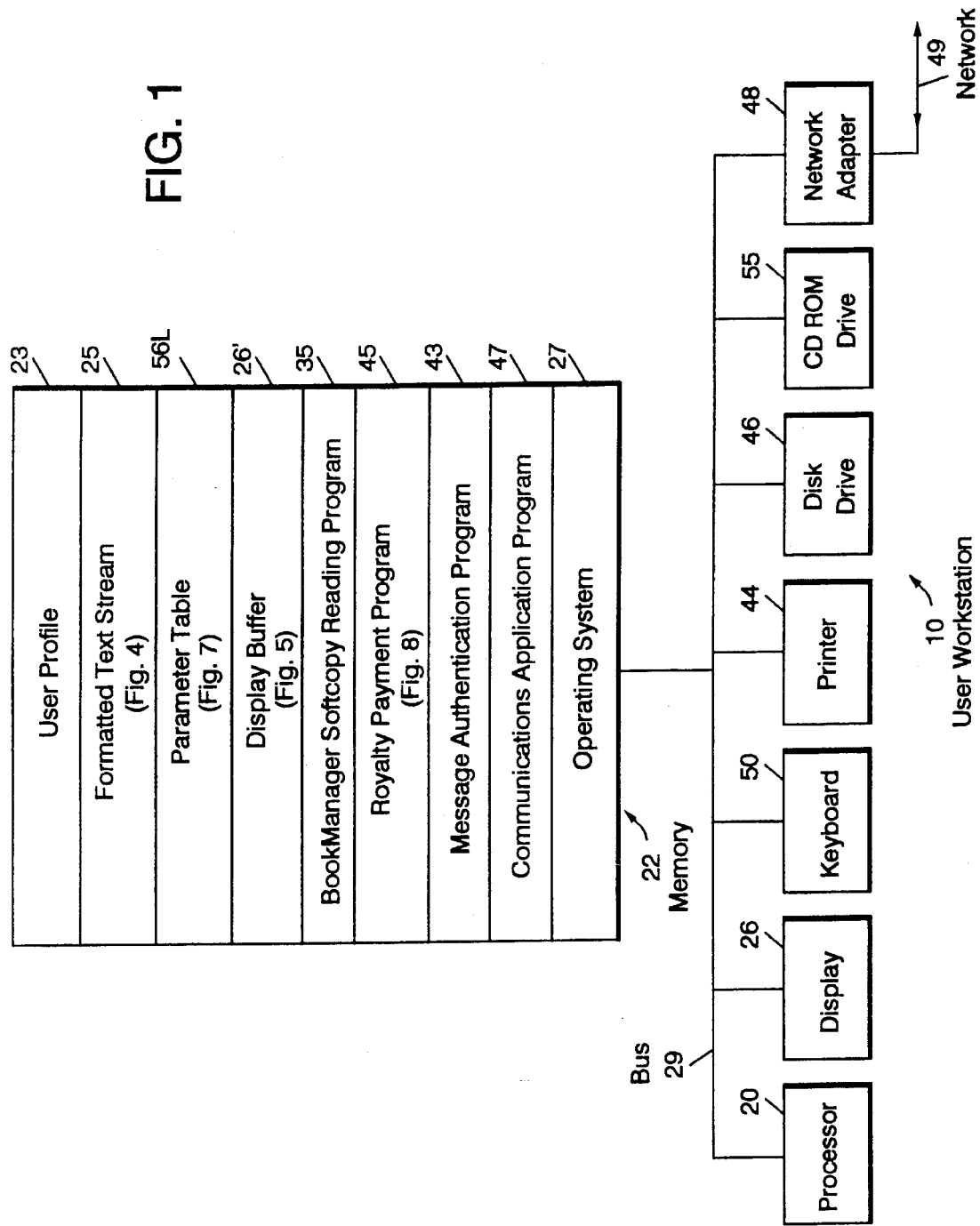
FIG. 1 is a system block diagram of the user's workstation, including the royalty payment program, in accordance with the invention.

FIG. 1 is a system block diagram of the user's workstation, including the royalty payment program 45, in accordance with the invention. The workstation 10 includes the processor 20 which is connected by means of the bus 29 to the memory 22. The processor 20 executes program instructions for the programs stored in the memory 22. Also connected to the bus 29 are the display 26, keyboard 50, printer 44, magnetic disk drive 46, compact optical disk drive 55 and the network adapter 48. The network adapter 48 is connected to the communications network 49, which can be the public switched telephone network.

The memory 22 stores User Profile 23, the structured document, formatted text stream 25 (FIG. 4), Loaded Parameter Table 56L (FIG. 7), Display Buffer 26' (FIG. 5), BookManager Softcopy Reading Program 35, Royalty Payment Program 45 (FIG. 8), Communications Application Program 47, and Operating System 27.

Figure 2:
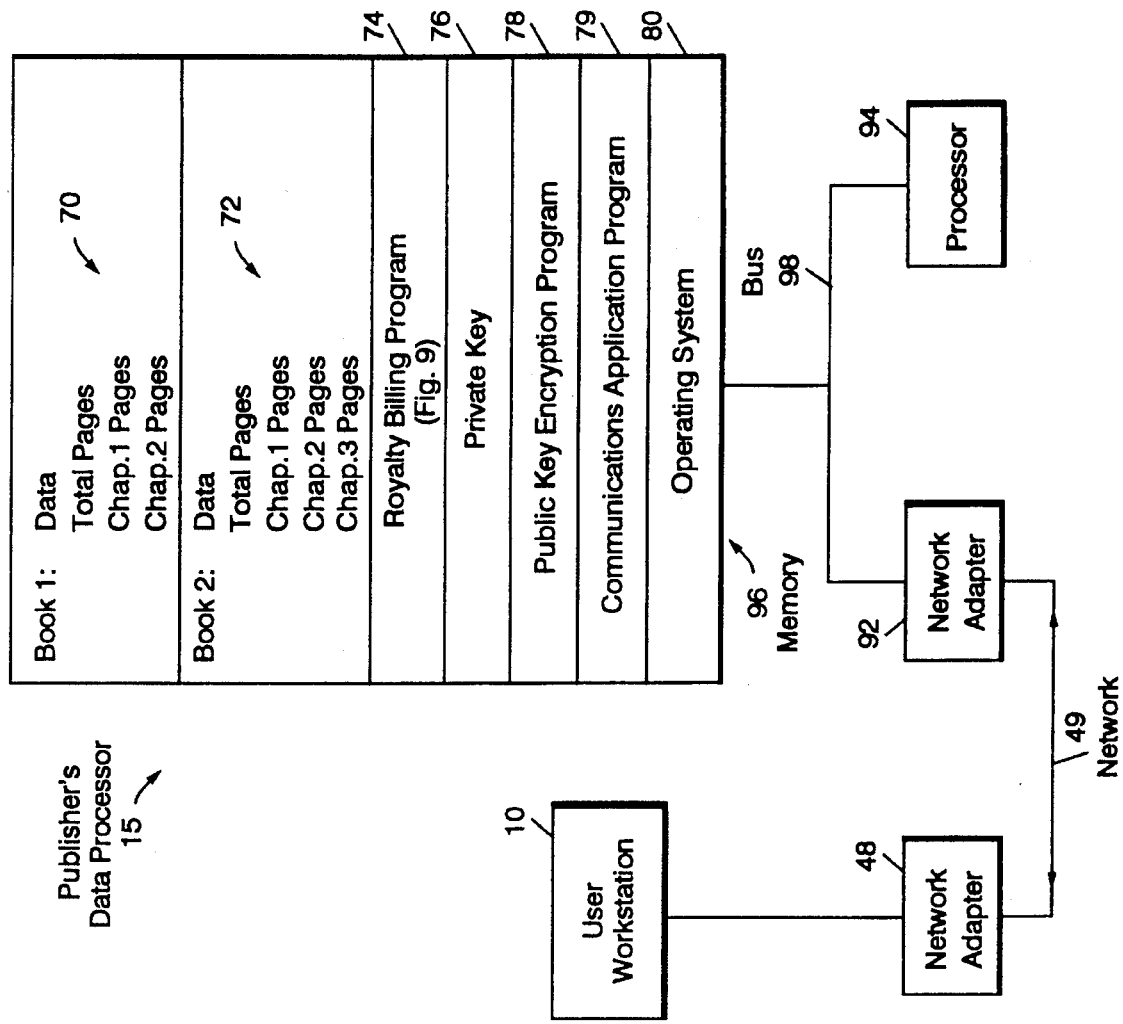
FIG. 2 is a system block diagram of the publisher's data processor, including the royalty billing program, in accordance with the invention.

The user's workstation is connected over the network 49 to the publisher's data processor 15, as is shown in FIG. 2. The publisher's data processor 15 includes the network adapter 92 which is connected to the network 49 and to the bus 98. Also connected to the bus 98 is the processor 94 and the memory 96. The processor 94 executes program instructions for the programs stored in the memory 96.

The memory 96 stores first book data 70 which includes Total Pages, Chap. 1 Pages and Chap. 2 Pages for the first book. It also stores second book data 72 which includes Total Pages, Chap. 1 Pages, Chap. 2 Pages, and Chap. 3 Pages for the second book. It also stores the Royalty Billing Program 74 (FIG. 9), Publisher's Private Key 76, Public Key Encryption Program 78, Communications Application Program 79, and Operating System 80.

The author or publisher of a softcopy book specifies the royalty amount he wants to be paid by users who copy the book or individual chapters of the book. The source text of the book has the form of the structured document, formatted text stream 25. In accordance with the invention, the publisher includes royalty payment information either within the structured document text of the book or in a royalty payment information file which accompanies the book. Two examples are given of a structured document, formatted text stream which includes royalty payment information, the first example being shown in FIGS. 3A, 3B and 3C.

Figure 3B:
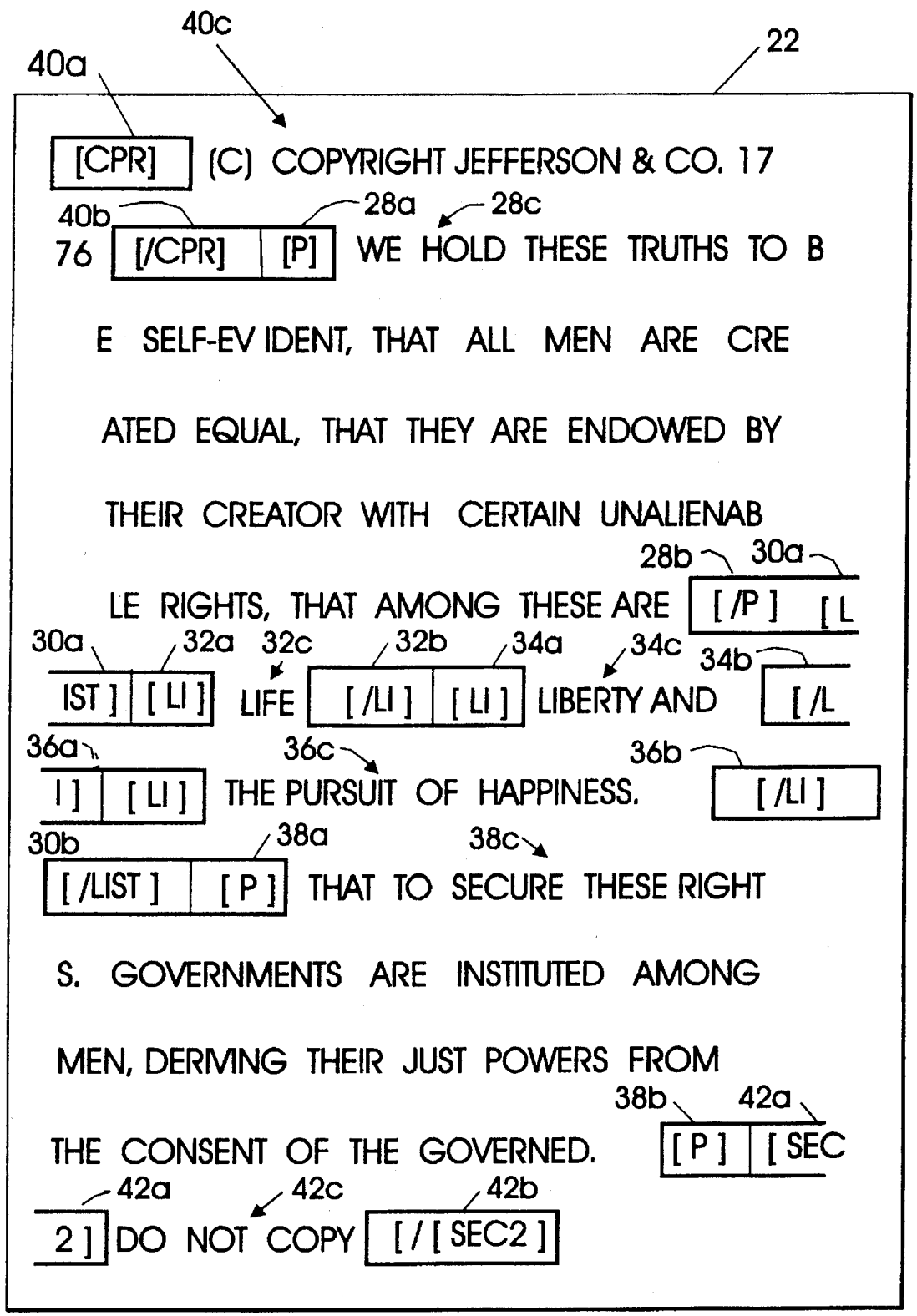
FIG. 3B illustrates the memory organization of element tags and associated text, for the first example of FIG. 3A.
Figure 3C:
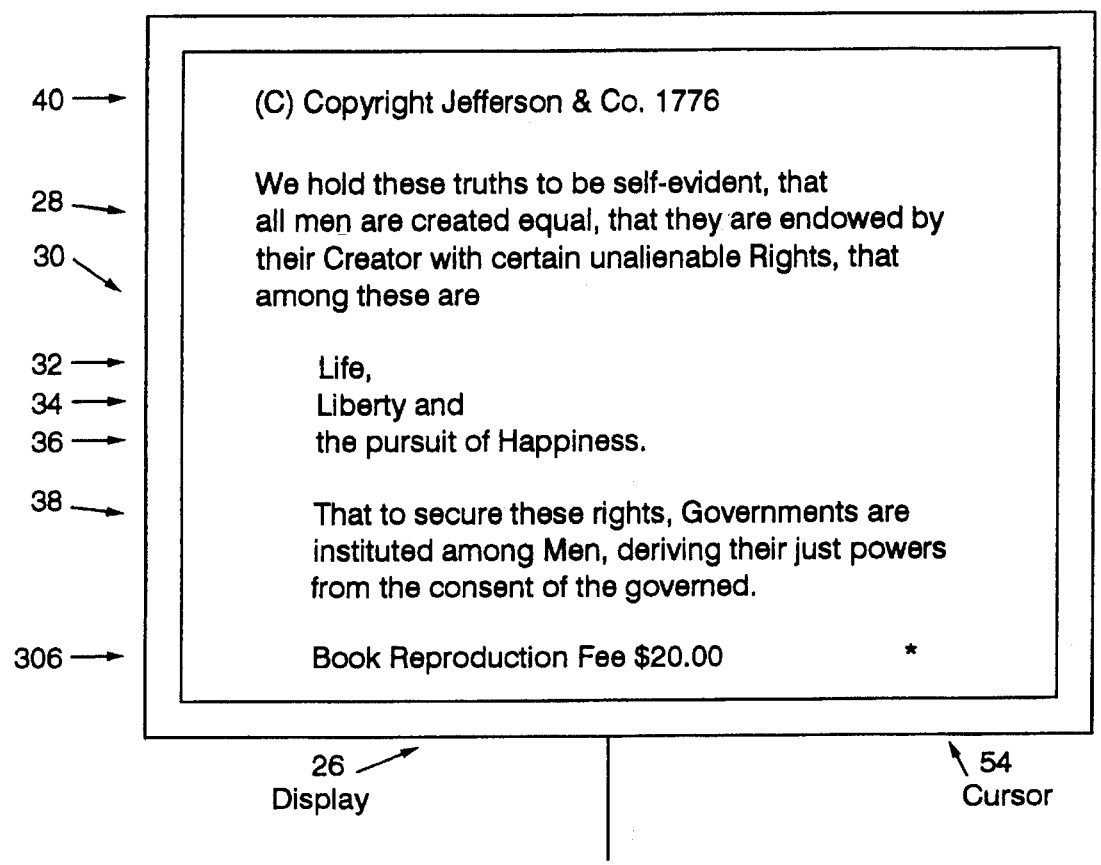
FIG. 3C illustrates the appearance of the display of text for the first example of FIGS. 3A and 3B.

The display device 26 coupled to the processor 20 displays in WYSIWYG form, a plurality of document elements such as paragraphs 28 and 38, the list 30, which includes the list items 32, 34 and 36 shown in the display 26 of FIG. 3C. Cursor 54 is also shown. The elements can include lists which are either ordered or unordered, and elements can also include graphics as well as text. Of special note is the copyright notice 40 and the "Book Reproduction Fee" royalty message 306 displayed in WYSIWYG form for the page of the structured document shown in the display 26 of FIG. 3C. The document elements 28–42 are organized in a formatted text stream having an ordered sequence, as can be seen in FIG. 3A, using structured document notation, where the ordered sequence is specified by a corresponding ordered sequence of the plurality of element tags. The paragraph 28 in FIG. 3A is shown in the structured document notation with the begin tag [p] and the end tag [/p]. Each element such as the paragraph 28 shown in FIG. 3A, is a structured document element having a begin tag [p], the text of the paragraph in this example, and then an end tag [/p]. The begin tag and the end tag serve to identify the element type, in this case indicating a paragraph. The order of occurrence of the WYSIWYG display of paragraph 28 on the display 26 is determined by the order of occurrence in the formatted text stream of the structured document element representing that paragraph 28 shown in FIG. 3A, within the context of the order of occurrence of the other structured document elements, as for example, the list 30 and the paragraph 38.

In accordance with the invention, special strings such as the royalty message 306, are embedded within special elements having special structured document tags in the structured document. Specifically, the royalty message element 306 is a string embedded between a begin tag [royalty] and an end tag [/royalty]. When the processor 20 detects the presence of a special tag such as a royalty begin tag, it makes special note of its presence within the memory 22, so that when specified printer 44, disk drive storage 46, or communications adapter 48 functions are requested, copying is inhibited and a royalty payment process in invoked. For example, if a royalty element 306 is identified in the document text 25, then the printer 44 function will be inhibited if the user requests the printing of the structured document within which the royalty element is identified.

The order of occurrence of the structured document elements such as the paragraph 28, list 30 and paragraph 38, can be determined by their order of occurrence in the formatted text stream stored in the memory 22 as is shown in FIG. 3B. FIG. 3B shows that the structured document text with its tags of FIG. 3A, have been stored in the memory 22 in a linear sequential order, which is the formatted text stream 25. Paragraph element 28 includes tags 28a and 28b and text 28c. List element 30 includes tags 30a and 30b. List item element 32 includes tags 32a and 32b and text 32c. List item element 34 includes tags 34a and 34b and text 34c. List item element 36 includes tags 36a and 36b and text 36c. Paragraph element 38 includes tags 38a and 38b and text 38c.

Figure 7:
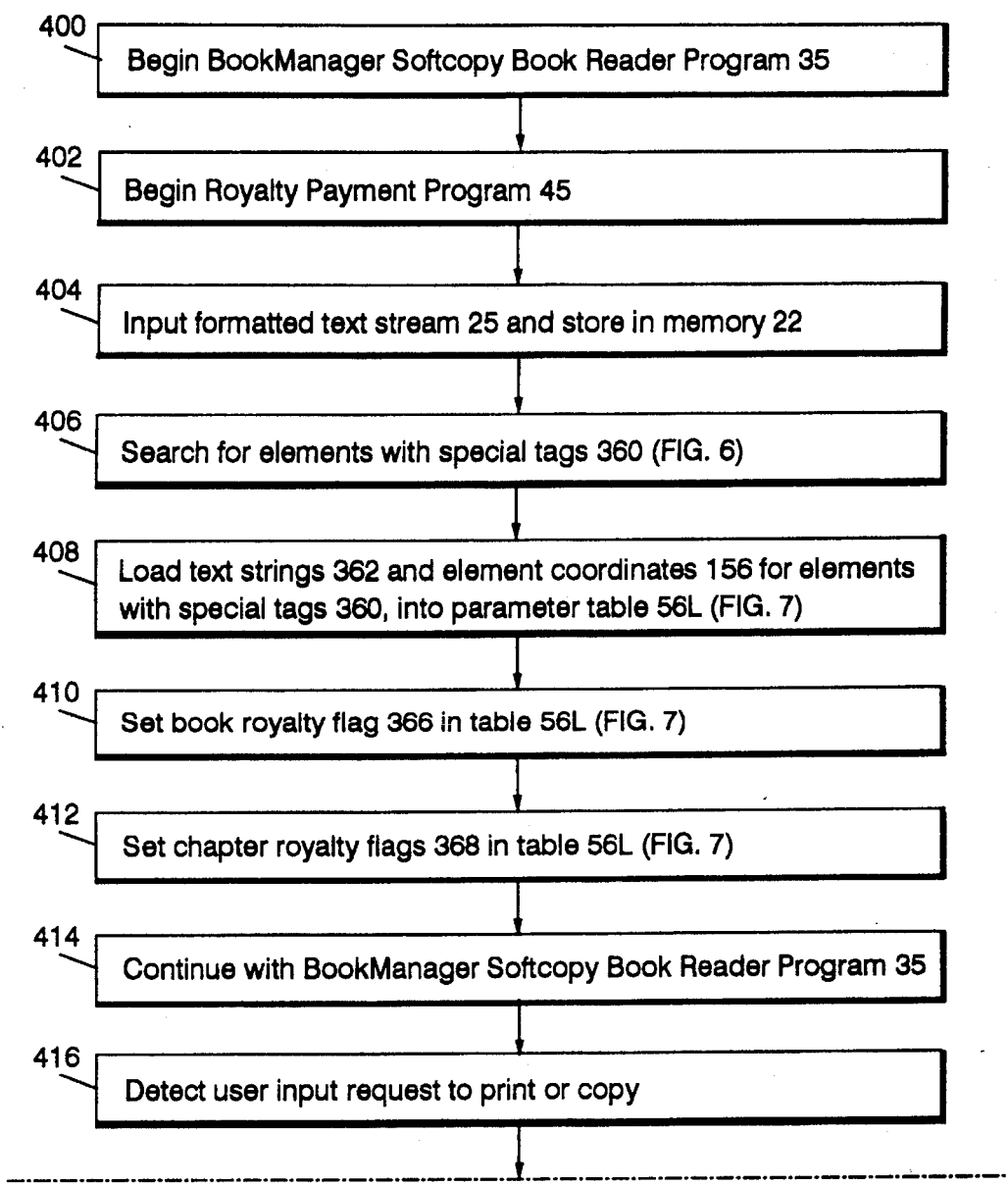
FIG. 7 is a diagram of the parameter table 56 after the it has been loaded with information from elements with special tags.

The special copyright notice element is represented by the begin tag 40a and the end tag 40b which surrounds the copyright notice string 40c. Similarly, the special royalty message "Book Reproduction Fee" element is represented by the begin tag 306a, and the end tag 306b, which surrounds the "Book Reproduction Fee" string 306c the book reproduction fee royalty amount is represented by the beginning tag 308A, the end tag 308B, and the text or amount of the actual fee in 308C as illustrated in FIG. 3b. In accordance with the invention, when the processor 20 searches through the formatted text stream 25 stored in the memory 22 and detects the presence of the begin tag 306a or the end tag 306b for the royalty message string 306c, the processor loads the royalty message string 306c into a specified partition 306I of the parameter table 56 shown in FIG. 6 in the memory 22 and it sets a flag 366 or 368 to indicate the presence of a royalty message string, as shown in FIG. 7.

Still further in accordance with the invention, at the time of initial program loading for the royalty payment program 45 into the data processing system shown in FIG. 1, a default parameter table 56 is loaded into memory at a pre-specified partition. The default parameter table 56 shown in FIG. 6 will have a set of initial default values entered therein which are stored in the memory 22. Alternately, the user can enter a profile of values for the parameter table 56. The parameter table 56, as loaded at the initial program loading, will include the characters representing each special tag such as the royalty tag "[royalty]" and the like, as is shown in column 364 of FIGS. 6 and 7. Also included in column 364 of the parameter table 56 of FIG. 6 will be values indicating the response which the data processing system is to make when particular tagged strings are identified in the document text loaded into the memory 22. For example, if a royalty tag "[royalty]" is detected in a structured document, then the default parameter table 56 will indicate that if the document is to be displayed on the display 26, the page displayed will include the royalty message. It may be seen that FIG. 6 illustrates an initially unloaded parameter table 56, in which the various horizontal row entries are designated 300I, 302I, 304I, 306I, 308I, 310I, 312I, and 314I. In this notation, the "I" stands for the "initial" designation value column for the named special tags appearing in column 360 in FIG. 6. FIG. 7 illustrates the same table 56, but with "L" designations indicating the "as loaded" values in rows 300L, 302L, 304L, 306L, 308L, 310L, 312L, 314L, 318L, 320L, 322L, 344L, 346L, and 348L. The special tags appear in column 360 of loaded parameter table 56L shown in FIG. 7 and the text string which will be loaded from the elements in the structured document having the special tags are illustrated as loaded in column 362 of FIG. 7.

FIG. 4 is a more detailed diagram of the memory image for a second example of the formatted text stream 25, showing in particular the paragraph coordinates 156 associated with each particular paragraph, heading and other element in the formatted text stream 25. The formatted text stream 25 illustrated in FIG. 4 has structured document tags similar to those referenced above. The structured document of FIG. 4 is shown as it is displayed in WYSIWYG form on the display 26 of FIG. 5. The structured document 25 of FIG. 4 has three major parts, the book title portion consisting of elements 300 to 314, the first chapter portion consisting of elements 316 to 340, and the second chapter portion consisting of elements 342 to 350.

The book title portion of the second example document 25 of FIG. 4, has the following elements:
"[bk] Book Title [/bk]" 300,
"[ed] Second Edition [/ed]" 302,
"[cpr] (C) ABC Co 1990 [/cpr]" 304,
"[royalty] Book Reproduction Fee [/royalty]" 306,
"[amount] $20.00 [/amount]" 308, "[phone] 1-800-123-1234 [/phone]" 310,
"[public key] 13A723F9 . . . 6 [/public key]" 312, and
"[validation] The Book Repro Fee Is Paid [/validation]" 314.

Royalty message 306 is represented by the special tag [royalty] followed by the special royalty message string "Book Reproduction Fee" and followed by the end tag [/royalty]. The default table 56 column 364 of FIG. 7 shows that this string will be displayed on the display 26. When a royalty element such as 306, is the first to occur in a structured document 25 and it does not occur within a chapter heading such as [hl], it is considered a global element which is given effect for the entire book. It is flagged in the book royalty flag column 366 of the default table 56 of FIG. 7. Since royalty element 306 is the first occurring royalty element in the structured document 25, it represents the royalty message for copying the entire book. The associated royalty information in the special elements which occur immediately following royalty message 306 are also considered global elements which apply when the entire book is to be copied. The associated elements to royalty element 306 are "[amount] $20.00 [/amount]" 308, "[phone] 1-800-123-1234 [/phone]" 310, "[public key] 13A723F9 . . . 6 [/public key]" 312, and "[validation] The Book Repro Fee Is Paid [/validation]" 314.

The element "[amount] $20.00 [/amount]" 308 represents the charge for copying the entire book. The default table 56 column 364 of FIG. 7 shows that this string will be displayed on the display 26.

The element "[phone] 1-800-123-1234 [/phone]" 310 represents the phone number of the publisher's data processor 15, which is called over the telephone network 49. The default table 56 column 364 of FIG. 7 shows that this string will be displayed on the display 26.

The element "[public key] 13A723F9 . . . 6 [/public key]" 312 is the publisher's public key which the user's royalty payment program 45 uses to validate that the authorization message received from the publisher is authentic. The default table 56 column 364 of FIG. 7 shows that this string will not be displayed on the display 26.

The element "[validation] The Book Repro Fee Is Paid [/validation]" 314, is the string which the user's royalty payment program 45 compares with the publisher's authorization message to insure that it is authentic. The default table 56 column 364 of FIG. 7 shows that this string will not be displayed on the display 26.

The first chapter portion of the second example document 25 of FIG. 4, has the following elements:
"[hl] First Chapter Heading [/hl]" 316,
"[royalty] Chapter Reproduction Fee [/royalty]" 318,
"[amount] $ 1.00 [/amount]" 320,
"[validation] First Chapter Fee Paid [/validation]" 322,
"[p] Paragraph of text [/p]" 324,
"[h2] First topic heading [/h2]" 326,
"[p] Paragraph of text [/p]" 328,
"[p] Paragraph of text [/p]" 330,
"[h2] Second topic heading [/h2]" 332,
"[p] Paragraph of text [/p]" 334,
"[h3] First subtopic heading [/h3]" 336,
"[p] Paragraph of text [/p]" 338, and
"[p] Paragraph of text [/p]" 340, The structured document tags for the first chapter heading is the begin tag [hl] and the end tag [/hl]. Under the chapter heading, there are four elements, the first being a royalty message 318 represented by the special tag [royalty] followed by the special royalty message string "Chapter Reproduction Fee" and followed by the end tag [/royalty]. The default table 56 column 364 of FIG. 7 shows that this string will be displayed on the display 26. When a royalty element occurs within a chapter heading such as [hl], it is considered a local element which is given effect only within the chapter hl. It is flagged in the chapter royalty flag column 368 of the default table 56 of FIG. 7. Since royalty element 318 is the second occurring royalty element in the structured document 25, occurring after the royalty element 306, it is not substituted for the book royalty element 306.

The associated royalty information in the special elements which occur immediately following royalty message 318 are also considered local elements which apply only to the first chapter when it is to be copied. The associated elements to royalty element 318 are "[amount] $ 1.00 [/amount]" 320, and "[validation] First Chapter Fee Paid [/validation]" 322.

The second element is a royalty amount 320 represented by the special tag [amount] followed by the special royalty amount string "$ 1.00" and followed by the end tag [/amount]. The default table 56 column 364 of FIG. 7 shows that this string will be displayed on the display 26.

The third element is a validation datum 322 represented by the special tag [validation] followed by the special validation string "First Chapter Fee Paid" and followed by the end tag [/validation]. The default table 56 column 364 of FIG. 7 shows that this string will not be displayed on the display 26.

The fourth element under the chapter heading is a paragraph element 324 denoted by a paragraph begin tag [p] and an end tag [/p].

The formatted text stream 25 is characterized by a hierarchical organization, in that the first topic heading element 326 depicted by its begin tag [h2] and end tag f/h2], is subsidiary to the chapter heading element 316 in the hierarchy. Use is made of this hierarchical structure for the formatted text stream 25, to establish a coordinate system 156.

The coordinate system 156 is shown in FIG. 4 as it can be stored in memory 22, with six digits representing the hierarchical level of the particular heading or element entry to which the coordinate is associated. For example, the paragraph element 330 has a coordinate of bk=1 h1=1, h2=1, h3=0, p=2 and el=1. This means that the element 330 is part of the first book bk=1, part of the first hl chapter heading, part of the first h2 topic heading, and is not part of any subsidiary topic heading to the first topic heading. The p=2 coordinate represents that element 330 is the second paragraph element under the first topic heading. The el=1 coordinate represents that the element 330 is the first element in the paragraph.

The second chapter portion of the second example document 25 of FIG. 4, has the following elements:
"[hl] Second Chapter Heading [/hl]" 342,
"[royalty] Chapter Reproduction Fee [/royalty]" 344,
"[amount] $ 2.00 [/amount]" 346,
"[validation] Second Chapter Fee Paid [/validation] 348, and
"[p] Paragraph of text [/p]" 350.

The structured document tags for the second chapter heading 342 is the begin tag [hl] and the end tag [/hl]. Under the chapter heading 342, there are four elements, the first being a royalty message 344 represented by the special tag [royalty] followed by the special royalty message string "Chapter Reproduction Fee" and followed by the end tag [/royalty]. The default table 56 column 364 of FIG. 7 shows that this string will be displayed on the display 26. When a royalty element occurs within a chapter heading such as 342, it is considered a local element which is given effect only within the second chapter 342. It is flagged in the chapter royalty flag column 368 of the default table 56 of FIG. 7. Since royalty element 344 is the third occurring royalty element in the structured document 25, occurring after the royalty elements 306 and 318, it is not substituted for the book royalty element 306.

The associated royalty information in the special elements which occur immediately following royalty message 344 are also considered local elements which apply only to the second chapter when it is to be copied. The associated elements to royalty element 344 are "[amount] $ 2.00 [/amount]" 346, and "[validation] Second Chapter Fee Paid [/validation] 348.

The second element is a royalty amount 346 represented by the special tag [amount] followed by the special royalty amount string "$ 2.00" and followed by the end tag [/amount]. The default table 56 column 364 of FIG. 7 shows that this string will be displayed on the display 26.

The third element is a validation datum 348 represented by the special tag [validation] followed by the special validation string "Second Chapter Fee Paid" and followed by the end tag [/validation]. The default table 56 column 364 of FIG. 7 shows that this string will not be displayed on the display 26.

The fourth element under the chapter heading is a paragraph element 350 denoted by a paragraph begin tag [p] and an end tag l/p].

The author or publisher of a softcopy book specifies the royalty amount he wants to be paid by users who copy the book or individual chapters of the book. The source text of the book has the form of the structured document, formatted text stream 25. In accordance with the invention, the publisher includes royalty payment information either within the structured document text of the book or in a royalty payment information file which accompanies the book.

Figure 10:
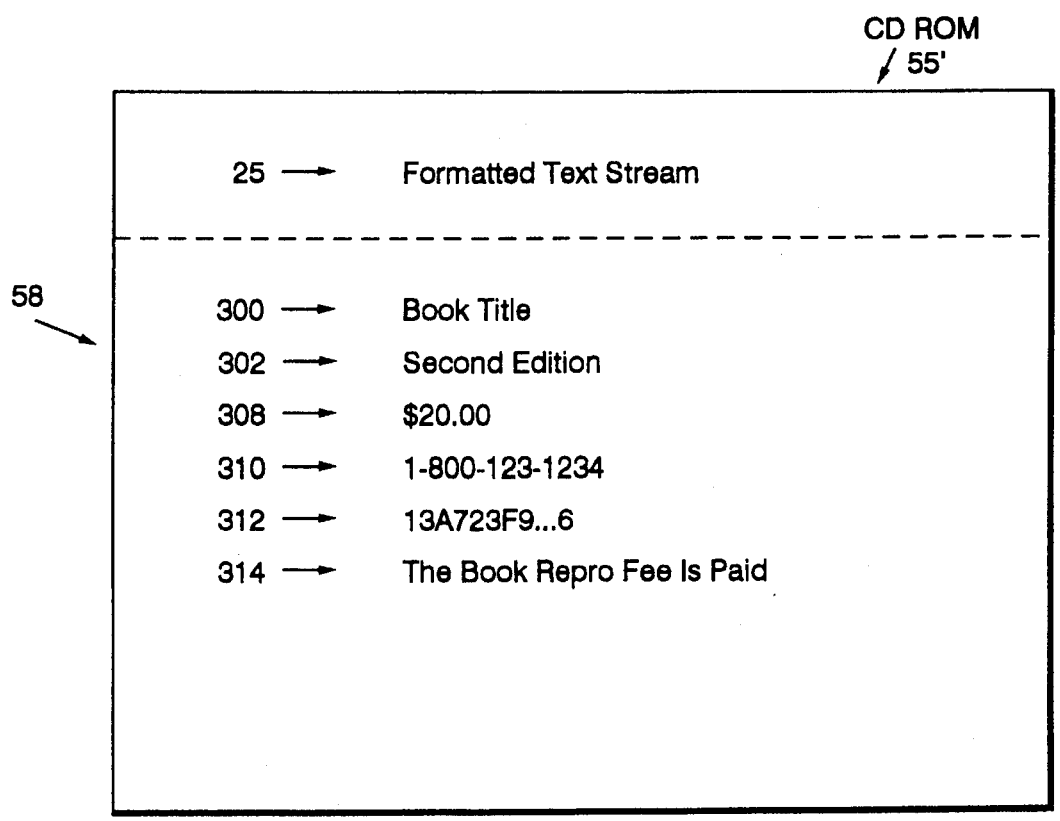
FIG. 10 illustrates the CD ROM 55' which includes the softcopy book and the royalty information file 58, in a second embodiment of the invention.

In accordance with the invention, the publisher includes royalty payment information either within the structured document text of the book as shown in FIG. 4 or in a royalty payment information file 58 which accompanies the book, as shown in FIG. 10. The publisher then writes a copy of the book onto a compact disk optical storage medium, a floppy disk magnetic storage medium, or other suitable storage medium, 55'. The book is stored on the storage medium as a compacted, tokenized text.

To read the book from the storage disk, the user applies a special softcopy book reading program 35, at his workstation 10, which reconverts the compacted, tokenized text into the structured document source text, which is then capable of being displayed on a display device 26, as shown in FIG. 5.

Figures 2, 8:
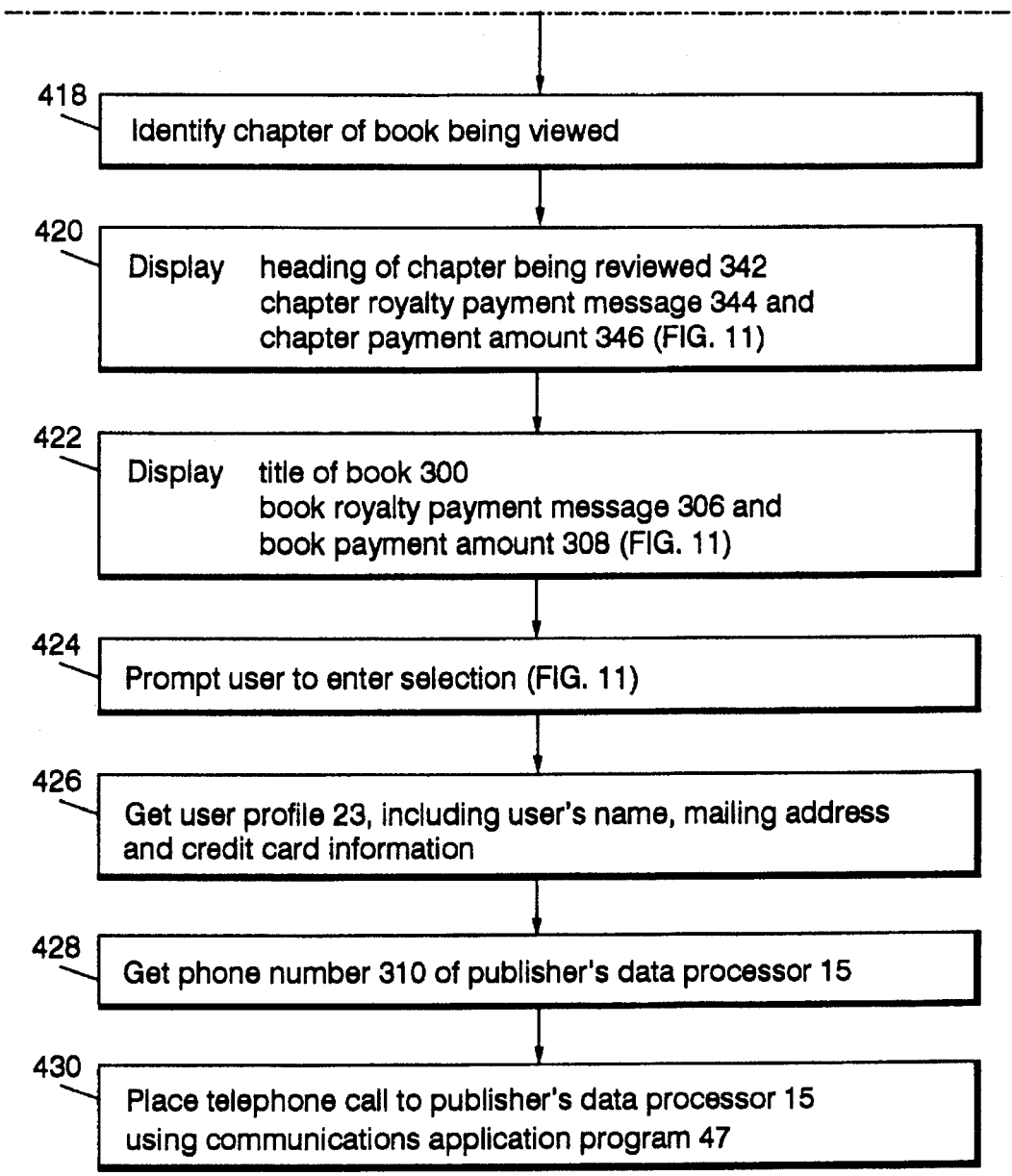

In accordance with the invention, the user also applies a royalty payment program 45 of FIG. 8 in conjunction with the softcopy book reading program 35. If the user enters a command to copy the book onto a writable storage medium such as a magnetic disk on disk drive 46 or to print a hardcopy of the book with a printer 44 or to transmit a copy of the book over a modem and network adapter 48, the royalty payment program 45 intercepts the copying command and suspends the copying operations.

Instead, the the royalty payment program 45 presents the user with a display of the royalty payment information stored in the book text of FIG. 4 or in the file 58 accompanying the book. The user must select the option of paying a royalty to the publisher before the royalty payment program permits a copy of the book to be made.

The royalty payment information contained in the structured document text 25 of the softcopy book shown in FIG. 4 or in the royalty information file 58 accompanying the softcopy book, can include royalty payment information on individual chapters of the book, as well as on the entire book. If the user is displaying a particular chapter of the book at his workstation at the time he enters the copying command, the royalty payment program 45 displays royalty payment information for the current chapter being displayed, as well as that for the entire book, as is shown in FIG. 11.

When the user selects to pay the royalty, a communication session is established between the user's workstation 10 and the publisher's data processor 15, for example by placing a call through a modem and network adapter 48 and over the public telephone network 49. A message is sent by the royalty payment program 45 to the publisher's data processor 15, requesting that the user be permitted to make a copy of a specified part of the book or of the entire book. The request message includes the user's name, his mailing address, and his credit card number or other billing information. The message also contains enough information about the book so that the publisher's data processor can compute the royalty amount the user is to pay.

Figure 9A:
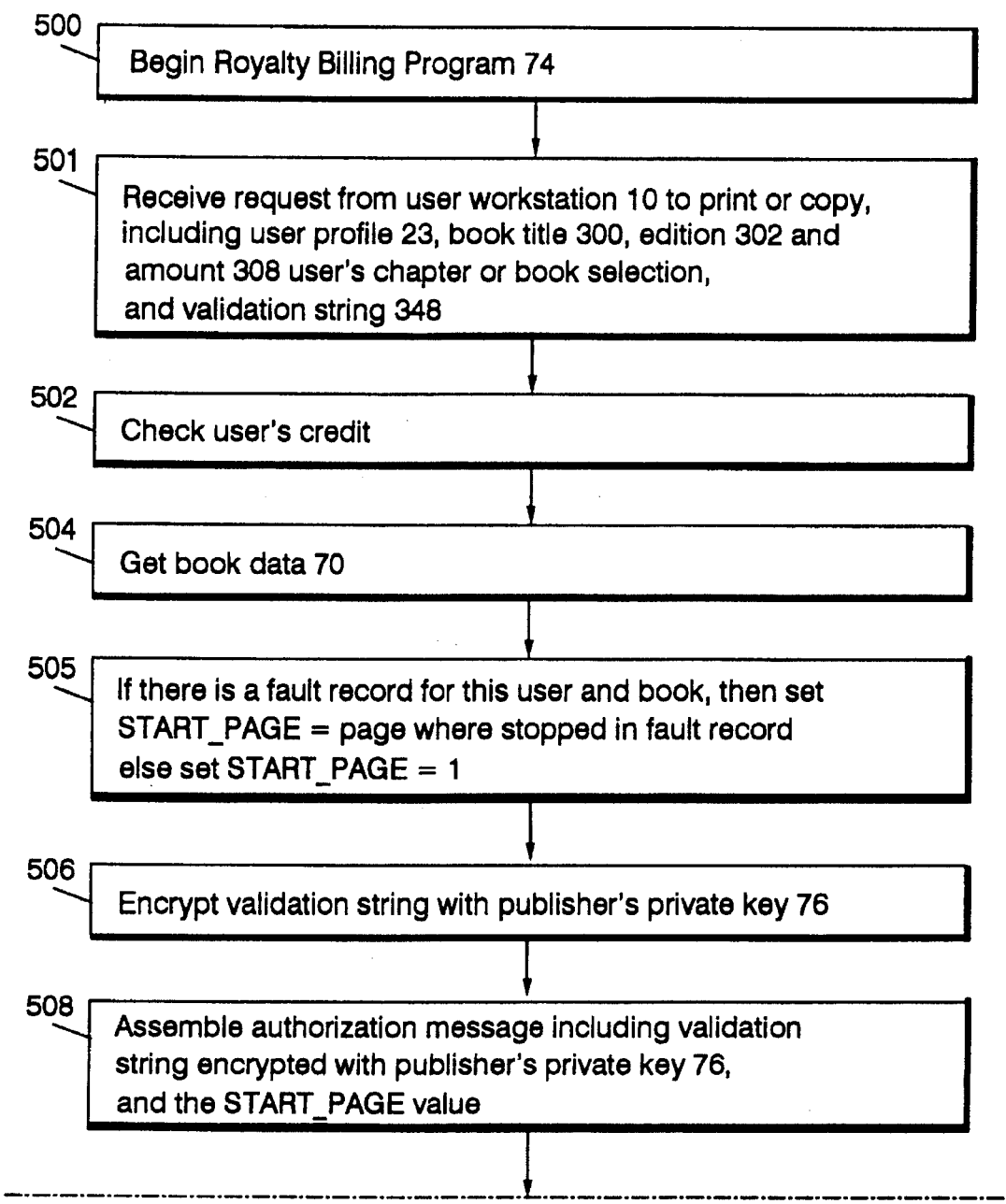
FIG. 9 is a flow diagram of the royalty billing program 74.
Figure 9B:
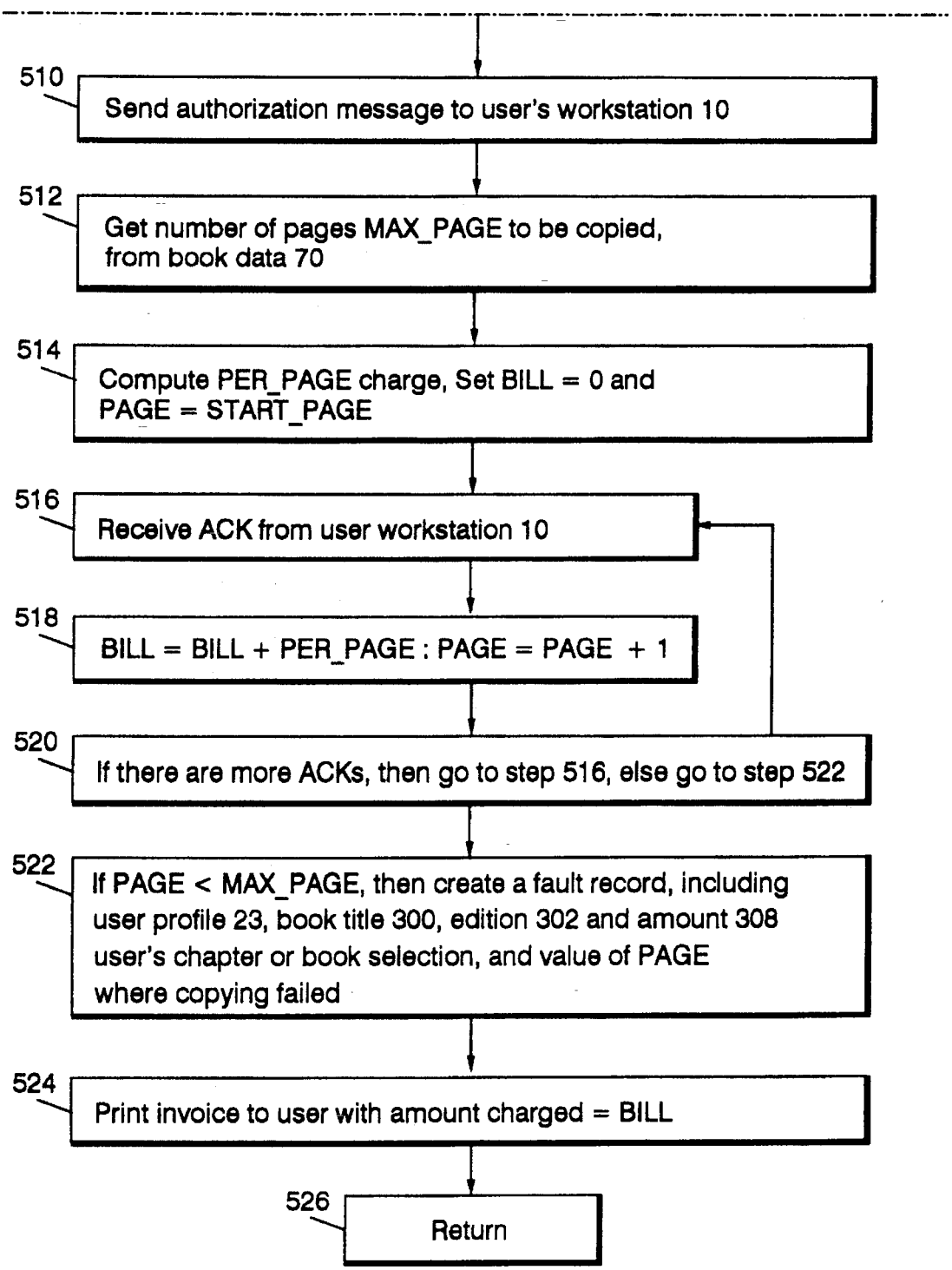

The publisher's data processor 15 has a royalty billing program 74, shown in FIG. 9, which receives and processes the user's request message. After checking that the user's offered mode of payment is effective, the royalty billing program 74 in the publisher's data processor 15, sends back to the user's royalty payment program 45, an authorization message to make the proposed copy. The royalty payment program 45 in the user's workstation 10 then recommences the copying operation which was suspended, allowing the proposed copy of the book to be made.

The royalty billing program 74 in the publisher's data processor 15 records the request by the user to make the copy of the book, and prepares a bill to the user's credit card account.

The authorization message sent by the royalty billing program in the publisher's data processor 15 in response to the user's request, can contain authentication data which is used by the royalty payment program 45 in the user's workstation 10 to authenticate the authorization message from the publisher. This prevents the user or others from circumventing the royalty payment process.

In accordance with the invention, the authorization message may also contain starting page data which is used in the recovery of aborted copying sessions by the user. As the user is making the proposed copy, an acknowledgement signal is periodically sent from the user's workstation 10 to the publisher's data processor 15, as shown in FIG. 8. This is done for each page or chapter successfully copied by the user. The royalty billing program 74 in the publisher's data processor 15 counts the acknowledgement signals, as shown in FIG. 9. If the user's copying of the book fails before the proposed copying is completed, then the royalty billing program 74 in the publisher's data processor 15, stores a fault record with the number of the last page or chapter of the book which was successfully copied. This is indicated by the number of acknowledgement signals received by the publisher's royalty billing program 74. Later, when the user reconnects his workstation 10 with the publisher's data processor 15 and makes another request to copy the book, a new authorization message is sent by the publisher's royalty billing program 74 to the user's royalty payment program 45, with the identity of the last page or chapter successfully copied. If the user does not reconnect his workstation 10 to the publisher's data processor 15, then the royalty billing program 74 in the publisher's data processor 15 will bill the user for only the portion of the book which was successfully copied.

As was discussed above, the authorization message sent by the royalty billing program 74 in the publisher's data processor 15 in response to the user's request, can contain authentication data which is used by the royalty payment program 45 in the user's workstation 10 to authenticate the authorization message received from the publisher. The authentication data can be as simple as the publisher's royalty billing program 74 sending back a data word which is compared at the workstation 10 with a similar data word retained by the user's royalty payment program 45. Alternately, a more sophisticated authentication technique can be employed, such as the publisher's royalty billing program 74 applying a digital signature to the authorization message, which can be authenticated by the user's royalty payment program 45. The standard technique for applying a digital signature to authenticate a message is by use of a public key encryption algorithm.

Public key encryption algorithms are described in a paper by W. Diffie and M. E. Hellman entitled "Privacy and Authentication: An Introduction to Cryptography," Proceedings of the IEEE, Volume 67, No. 3, March 1979, pp. 397–427. Public key systems are based on dispensing with the secret key distribution channel, as long as the channel has a sufficient level of integrity. In a public key cryptographic system, two keys are used, one for enciphering and one for deciphering. Public key algorithm systems are designed so that it is easy to generate a random pair of inverse keys PU for enciphering and PR for deciphering and it is easy to operate with PU and PR, but is computationally infeasible to compute PR from PU. Each communicating party generates a pair of inverse transforms, PU and PR. The party keeps the deciphering transformation PR secret, and makes the enciphering transformation PU public by placing it in a public directory. Anyone can now encrypt messages and send them to the party, but no one else can decipher messages intended for him. It is possible, and often desirable, to encipher with PU and decipher with PR. For this reason, PU is usually referred to as a public key and PR is usually referred to as a private key.

A corollary feature of public key cryptographic systems is the provision of a digital signature which uniquely identifies the sender of a message. If party A wishes to send a signed message M to party B, party A operates on it with his private key PR to produce the signed message S. PR was used as party A's deciphering key when privacy was desired, but it is now used as his "enciphering" key to send a digital signature. When party B receives the message S, he can recover the message M by operating on the ciphertext S with party A's public PU. By successfully decrypting party A's message, the receiver B has conclusive proof it came from the sender A. Digital signatures can be produced either by encrypting the data to be signed with the private key, which works well when the data is short, or by first hashing the data with a strong one-way cryptographic function and encrypting the so-produced hashed value with the private key. Either method will work.

A method for producing digital signatures based on the hash of the data to be signed is taught in co-pending U.S. patent application by S. M. Matyas, et al., "A Hybrid Public Key Algorithm/Data Encryption Algorithm Key Distribution Method Based on Control Vectors," Ser. No. 07/748,407, filed Aug. 22, 1991, assigned to IBM Corporation and incorporated herein by reference.

Examples of public key cryptography are provided in the following U.S. patents: U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method."

The public key encryption technique is applied to appending the publisher's digital signature to the authorization message sent from the publisher's royalty billing program 74 to the user's royalty payment program 45. The publisher initially creates a public key and a corresponding private key 76, as discussed above. The publisher's public key is inserted as the public key element 312 into the formatted text stream 25 of the softcopy book of FIG. 4. The publisher then publishes the softcopy book on a CD ROM medium, which the user buys. In an alternate embodiment, the publisher's public key is included in the royalty information file 58 on the CD ROM 55' of FIG. 10.

When the user inputs a command to make a copy of the book, the user's royalty payment program 45 sends a copy of the validation string 314 to the publisher, along with his request to copy the book. If the request is to copy one chapter, such as the first chapter, then the validation string 322 for that chapter is sent to the publisher with the request. The publisher's royalty billing program 74 then operates on the validation string it receives from the user, by encrypting the string with the publisher's private key 76, using the public key encryption program 78. The publisher's royalty billing program 74 then sends the encrypted validation string back to the user as part of the authorization message.

The user's royalty payment program 45 then operates on the encrypted validation string it receives from the publisher, by decrypting it with the publisher's public key obtained from the public key element 312 contained in the softcopy book. The user's royalty payment program 45 uses a message authentication program 43 which includes the public key encryption algorithm referred to above, to perform the decryption. The decrypted validation string is then compared with the validation string 314 or 322 contained in the softcopy book. If the comparison is satisfied, then only the publisher's royalty billing program 74 could have sent the authorization message.

FIGS. 8 and 8A show a flow diagram of the royalty payment program 45, which is executed in the user's workstation 10.

FIG. 8 starts with step 400, Begin BookManager Softcopy Book Reader Program 35.

Then in step 402, Begin Royalty Payment Program 45.

Then in step 404, Input formatted text stream 25 and store in memory 22.

Then in step 406, Search for elements with special tags 360 (FIG. 6).

Then in step 408, Load text strings 362 and element coordinates 156 for elements with special tags 360, into parameter table 56L (FIG. 7).

Then in step 410, Set book royalty flag 366 in table 56L (FIG. 7).

Then in step 412, Set chapter royalty flags 368 in table 56L (FIG. 7).

Then in step 414, Continue with BookManager Softcopy Book Reader Program 35.

Then in step 416, Detect user input request to print or copy.

Then in step 418, Identify chapter of book being viewed.

Then in step 420, Display heading of chapter being reviewed 342, chapter royalty payment message 344 and chapter payment amount 346 (FIG. 11).

Then in step 422, Display title of book 300, book royalty payment message 306 and book payment amount 308 (FIG. 11).

Then in step 424, Prompt user to enter selection (FIG. 11).

Then in step 426, Get user profile 23, including user's name, mailing address and credit card information.

Then in step 428, Get phone number 310 of publisher's data processor 15.

Then in step 430, Place telephone call to publisher's data processor 15 using communications application program 47.

Then in step 432, Send request to publisher to print or copy, including user profile 23, book title 300, edition 302 and amount 308, user's chapter or book selection, and validation string 348.

Then in step 434, Receive authorization message from publisher's processor 15, including validation string encrypted with publisher's private key, and the START_PAGE value.

Then in step 436, Decrypt the encrypted validation string with publisher's public key 312, using the public key encryption algorithm in the message authentication program 43.

Then in step 438, If the decrypted validation string from the publisher compares with the validation string 348, then enable the printer 44 to print or the disk drive 46 to copy the selected chapter or book, beginning at the START_PAGE value.

Then in step 440, Send an ACK acknowledgement to the publisher's processor 15 when each page of the selection is successfully printed or copied.

Then in step 442, Optionally print the publisher' authorization message on the copy.

Then in step 444, Return to the BookManager Softcopy Book Reader Program 35.

FIG. 9 is a flow diagram of the royalty billing program 74, which is executed in the publisher's data processor 15.

FIG. 9 starts with step 500, Begin Royalty Billing Program 74.

Then in step 501, Receive request from user workstation 10 to print or copy, including user profile 23, book title 300, edition 302 and amount 308 user's chapter or book selection, and validation string 348.

Then in step 502, Check user's credit.

Then in step 504, Get book data 70.

Then in step 505, If there is a fault record for this user and book, then set START_PAGE=page where stopped in fault record, else set START_PAGE=1.

Then in step 506, Encrypt validation string with publisher's private key 76.

Then in step 508, Assemble authorization message including validation string encrypted with publisher's private key 76, and the START_PAGE value.

Then in step 510, Send authorization message to user's workstation 10.

Then in step 512, Get number of pages MAX_PAGE to be copied, from book data 70.

Then in step 514, Compute PER_PAGE charge, Set BILL=0 and PAGE=START_PAGE.

Then in step 516, Receive ACK from user workstation 10.

Then in step 518, BILL=BILL+PER_PAGE: PAGE=PAGE+1.

Then in step 520, If there are more ACKs, then goto step 516, else goto step 522.

Then in step 522, If PAGE<MAX_PAGE, then create a fault record, including user profile 23, book title 300, edition 302 and amount 308, user's chapter or book selection, and value of PAGE where copying failed.

Then in step 524, Print invoice to user with amount charged=BILL.

Then in step 526, Return to the main program.

FIG. 10 illustrates the CD ROM 55' which includes the softcopy book Formatted Text Stream 25 and the royalty information file 58, in a second embodiment of the invention.

FIG. 11 shows the display of royalty payment information at the user's workstation. In this example, two options are presented to the user for selection. The first is for "Reproduction Fees For Current Chapter Being Viewed". The example shown is for "Second Chapter Heading". The user may select this option by typing an "X" in the box. Alternately, the user may use a pointing device such as a mouse, to make the selection. The second option is for "Reproduction Fees For The Entire Book Being Viewed. For this option "Book Title", "Second Edition", and "Book Reproduction Fee" are displayed and can be selected in the same manner.

The resulting invention provides an improved means to enforce the payment of royalties to publishers and authors of softcopy books, when a reader desires to make a copy of a portion or all of the book.

Although a specific embodiment of the invention has been disclosed, it will be understood by those having skill in the art that changes can be made to the specific embodiment without departing from the spirit and the scope of the invention.

What is claimed is:

1. A method for managing the printing of pages of a structured document on a user's printer in a network, so as to comply with royalty payment requirements of the document, comprising the steps of:

loading into memory of a user's data processor in said network, a formatted text stream of a structured document which includes a plurality of portions, at least one portion having an associated document portion royalty payment element including an identification tag and a document portion royalty payment amount tag defining a document portion royalty payment amount:

receiving a print command from a user to print a portion of said document on a printer controlled by said user's data processor;

searching said formatted text stream to identify said document portion royalty payment element associated with the portion to be printed and storing said document portion royalty payment element in a memory in said user's data processor;

transmitting, in response to said print command and to said identified document portion royalty payment element, a request by said user's data processor to a second data processor in said network, for authorization to print said portion of said document, said request for authorization including said document portion royalty payment amount defined by said document portion royalty payment amount tag;

receiving said request at said second data processor and in response thereto, creating a charge of said document portion royalty payment amount to an account of said user;

transmitting from said second data processor to said user's data processor an authorization message for printing said portion of said document;

receiving said authorization message at said user's data processor and in response thereto, outputting a print control signal from said user's data processor to a user's printer to print, controlled by said user's data processor, said portion of said document.

2. The method of claim 1, wherein said step of loading into memory of said user's data processor a formatted text stream further comprises reading a file containing said formatted text stream from a storage medium coupled to said user's data processor;

said storage medium further including an address file containing a network address for said second data processor and wherein said step of transmitting said request for authorization from said user's data processor to said second data processor in said network further comprises:

reading said address file to access said network address of said second data processor.

3. The method of claim 2, wherein said step of transmitting said request for authorization from said user's data processor to a second data processor in said network, further comprises:

assembling document identity data for said document, portion specification data for said portion to be printed, and user identity data for said user; and including said document identity data, said portion specification data, and said user identity data in said request for authorization.

4. The method of claim 1, wherein said step of inputting a formatted text stream further comprises:

reading a file containing said formatted text stream from a storage medium coupled to said user's data processor wherein said storage medium further includes a validation file containing validation data for said second data processor; and wherein said step of transmitting an authorization message from said second data processor to said first data processor, further comprises the steps of:

transmitting sender identity data which identifies said second data processor as the actual sender of said authorization message; and reading said validation file to access said validation data at said first data processor; and wherein said step of receiving said authorization message at said user's data processor further comprises:

validating that said second data processor is the actual sender of said authorization message by processing said sender identity data with said validation data at said user's data processor.

5. The method of claim wherein said step of validating comprises comparing said sender identity data with said validation data.

6. The method of claim 4, wherein said validation data is the public key portion of a public key—private key pair issued by said second data processor;

said sender identity data is an encrypted message, encrypted by said second data processor under said private key; and wherein said step of validating further comprises a step of decrypting said encrypted message using said public key at said user's data processor.

7. The method of claim 1, wherein said step of outputting a print control signal from said first data processor, further comprises:

outputting a user's acknowledgement signal from said user's data processor to said second data processor when a first fraction of said portion of said document has been printed by said printer;

outputting a second acknowledgement signal from said user's data processor to said second data processor when a second fraction of said portion of said document has been printed by said printer; and further comprising a step at said second data processor of reducing the charged royalty payment amount if said second acknowledgement signal is not received.

8. The method of claim 7, further comprising steps of: outputting a second authorization message from said second data processor to said user's data processor in response to receiving said first acknowledgement signal from said user's data processor, said second authorization message giving authorization to print said second fraction of said portion of said document by said printer.

9. The method of claim 8, further comprising a step of said second data processor counting said acknowledgement signals from said user's data processor to enable resumption of said printing of said document at said second fraction if said second acknowledgement signal is not received by said second data processor.

10. A method for managing the copying of pages of a structured document on a copier included in a network so as to comply with royalty payment requirements of the document, comprising the steps of:

loading into memory of a user's data processor in said network, a formatted text stream of a structured document which includes a plurality of portions, at least one portion having an associated document portion royalty payment element including a document portion royalty payment amount tag defining a document portion royalty payment amount;

receiving a copy command from a user to copy a portion of said document on a copier controlled by said user's data processor;

searching said formatted text stream to identify said document portion royalty payment element associated with the portion to be copied and storing said document portion royalty payment element in a memory in said user's data processor;

transmitting a request in response to said copy command and to said identified document portion royalty payment element from said user's data processor to a second data processor in said network for authorization to copy said portion of said document, said request for authorization including said document portion royalty payment amount defined by said document portion royalty payment amount tag;

receiving said request at said second data processor and in response thereto, creating a charge of said document portion royalty payment amount to an account of said user;

transmitting from said second data processor to said user's data processor an authorization message for copying said portion of said document;

receiving said authorization message at said user's data processor and in response thereto, outputting a copy control signal from said user's data processor to said copying device to copy said portion of said document on said copying device.

11. The method of claim 10, wherein said step of inputting a formatted text stream further comprises:

reading a file containing said formatted text stream, from a storage medium coupled to said user's data processor;

wherein said storage medium further includes an address file containing a network address for said second data processor; and wherein said step of transmitting said request for authorization from said user's data processor to a second data processor in said network, further comprises a step of:

reading said address file to access said network address of said second data processor.

12. The method of claim 11, wherein said step of transmitting said request for authorization from said user's data processor to a second data processor in said network includes assembling document identity data for said document, portion specification data for said portion to be copied, and user identity data for said user and including said document identity data, said portion specification data, and said user identity data in said request for authorization.

13. The method of claim 10, wherein said step of inputting a formatted text stream further comprises:

reading a file containing said formatted text stream from a storage medium coupled to said user's data processor, wherein said storage medium includes a validation file containing validation data for said second data processor;

and wherein said step of transmitting an authorization message from said second data processor to said first data processor, further comprises the steps of:

transmitting sender identity data which identifies said second data processor as the actual sender of said authorization message; and reading said validation file to access said validation data at said first data processor; and wherein:

said step of receiving said authorization message at said user's data processor further comprises validating that said second data processor is the actual sender of said authorization message by processing said sender identity data with said validation data at said user's data processor.

14. The method of claim 13, wherein said step of validating comprises comparing said sender identity data with said validation data.

15. The method of claim 13, wherein said validation data is the public key portion of a public key—private key pair issued by said second data processor;

said sender identity data is an encrypted message, encrypted by said second data processor under said private key; and wherein, said step of validating further comprises a step of decrypting said encrypted message using said public key at said user's data processor.

16. The method of claim 10, wherein said step of outputting a copy control signal from said first data processor, further comprises:

outputting a first acknowledgement signal from said user's data processor to said second data processor when a first fraction of said portion of said document has been copied by said copying device;

outputting a second acknowledgement signal from said user's data processor to said second data processor when a second fraction of said portion of said document has been copied by said copying device; and further comprises a step at said second data processor of reducing the changed royalty payment amount if said second acknowledgement signal is not received.

17. The method of claim 16, further comprising steps of outputting a second authorization message from said second data processor to said user's data processor in response to receiving said first acknowledgement signal from said user's data processor, said second authorization message giving authorization to copy said second fraction of said portion of said document by said copying device.

18. The method of claim 17, further comprising a step of said second data processor counting said acknowledgement signals from said user's data processor to enable resumption of said copying of said document at said second fraction if said second acknowledgement signal is not received by said second data processor.

19. A method for managing the communicating of pages of a structured document on a communications apparatus in a network so as to comply with royalty payment requirements of the document, comprising the steps of:

loading into memory of a user's data processor in said network, a formatted text stream of a structured document which includes a plurality of portions, at least one portion having an associated document portion royalty payment element including an identification tag and a document portion royalty payment amount tag defining a document portion royalty payment amount;

receiving a communicate command from a user to communicate a portion of said document on a communications apparatus controlled by said user's data processor;

searching said formatted text stream to identify said document portion royalty payment element associated with the portion to be communicated and storing said document portion royalty payment element in a memory in said user's data processor;

transmitting a request in response to said communicate command and to said identified document portion royalty payment element from said user's data processor to a second data processor in said network, for authorization to communicate said portion of said document, said request for authorization including said document portion royalty payment amount defined by said document portion royalty payment amount tag:

receiving said request at said second data processor and in response thereto, creating a charge of said document portion royalty payment amount to an account of said user;

transmitting from said second data processor to said user's data processor an authorization message for communicating said portion of said document;

receiving said authorization message at said user's data processor and in response thereto, outputting a communicate control signal from said user's data processor to said communications apparatus to communicate said portion of said document on said communications apparatus.

20. The method of claim 19, wherein
said step of inputting a formatted text stream further comprises
reading a file containing said formatted text stream, from a storage medium coupled to said user's data processor;
wherein said storage medium further includes an address file containing a network address for said second data processor; and wherein
said step of transmitting said request for authorization from said first data processor to a second data processor in said network, further comprises
reading said address file to access said network address of said second data processor.

21. The method of claim 20, wherein
said step of transmitting said request for authorization from said user's data processor to a second data processor in said network includes:
assembling document identity data for said document, portion specification data for said portion to be copied, and user identity data for said user and
including said document identity data, said portion specification data, and said user identity data in said request for authorization.

22. The method of claim 19, wherein
said step of inputting a formatted text stream further comprises
reading a file containing said formatted text stream from a storage medium coupled to said user's data processor; wherein
said storage medium includes a validation file containing validation data for said second data processor;
and wherein said step of transmitting an authorization message from said second data processor to said user's data processor, further comprises the steps of
transmitting sender identity data which identifies said second data processor as the actual sender of said authorization message; and
reading said validation file to access said validation data at said first data processor; and wherein
said step of receiving said authorization message at said user's data processor further comprises
validating that said second data processor is the actual sender of said authorization message by processing said sender identity data with said validation data at said user's data processor.

23. The method of claim 22, wherein
said step of validating comprises comparing said sender identity data with said validation data.

24. The method of claim 22, wherein
said validation data is the public key portion of a public key—private key pair issued by said second data processor;
said sender identity data is an encrypted message, encrypted by said second data processor under said private key; and wherein
said step of validating further comprises a step of decrypting said encrypted message using said public key at said user's data processor.

25. The method of claim 19, wherein
said step of outputting a communicate control signal from said first data processor, further comprises
outputting a first acknowledgement signal from said user's data processor to said second data processor when a first fraction of said portion of said document has been copied by said communicating device;
outputting a second acknowledgement signal from said user's data processor to said second data processor when a second fraction of said portion of said document has been copied by said communicating device; and further comprises a step at
said second data processor of reducing the charged royalty payment amount if said second acknowledgement signal is not received.

26. The method of claim 25, which further comprises:
outputting a second authorization message from said second data processor to said user's data processor in response to receiving said first acknowledgement signal from said user's data processor;
said second authorization message giving authorization to communicate said second fraction of said portion of said document by said communicating device.

27. The method of claim 26, further comprising a step of
said second data processor counting said acknowledgement signals from said user's data processor to enable resumption of said communicating of said document at said second fraction if said second acknowledgement signal is not received by said second data processor.

28. A data processing system for managing the printing of pages of a structured document on a user's printer in a network, so as to comply with royalty payment requirements of the document, the system comprising:
input means for loading into memory of a user's data processor in said network, a formatted text stream of a structured document which includes a plurality of portions, at least one portion having an associated document portion royalty payment element including a document portion royalty payment amount tag defining a document portion royalty payment amount;
first receiving means coupled to said memory, for receiving a print command from a user to print a portion of said document on a printer device controlled by said user's data processor;
searching means coupled to said input means, for searching said formatted text stream to identify said document portion royalty payment element associated with the portion to be printed and storing said document portion royalty payment element in a memory in said user's data processor;
first transmitting means, responsive to said print command and to said identified document portion royalty payment element, coupled to said memory means, for transmitting from said user's data processor to a second data processor in said network a request for authorization to print said portion of said document, said request for authorization including said document portion royalty payment amount defined by said document portion royalty payment amount tag;
second receiving means in said second data processor for receiving said request at said second data processor and in response thereto, creating a charge of said document portion royalty payment amount to an account of said user;
second transmitting means coupled to said second receiving means for transmitting from said second data processor to said user's data processor an authorization message for printing said portion of said document;
authorization receiving means at said user's data processor for receiving said authorization message at said user's data processor and in response thereto, outputting a print control signal from said user's data processor to a user's printer, controlled by said user's data processor, to print said portion of said document on said printer.

29. A data processing system for managing the copying of pages of a structured document on a copier included in a network, so as to comply with royalty payment requirements of the document, the system comprising:

input means for loading into memory of a user's data processor in said network a formatted text stream of a structured document which includes a plurality of portions, at least one portion having an associated document portion royalty payment element including a document portion royalty payment amount tag defining a document portion royalty payment amount;

first receiving means coupled to said memory, for receiving a copy command from a user to copy a portion of said document on a copier controlled by said user's data processor;

searching means coupled to said input means, for searching said formatted text stream to identify said document portion royalty payment element associated with the portion to be copied and storing said document portion royalty payment element in a memory in said user's data processor;

first transmitting means coupled to said memory means and responsive to said copy command and to said identified document portion royalty payment element, for transmitting from said user's data processor to a second data processor in said network a request for authorization to copy said portion of said document, said request for authorization including said document portion royalty payment amount defined by said document portion royalty payment amount tag;

second receiving means in said second data processor for receiving said request at said second data processor and in response thereto, creating a charge of said document portion royalty payment amount to an account of said user;

second transmitting means coupled to said second receiving means for transmitting from said second data processor to said user's data processor an authorization message for copying said portion of said document;

authorization receiving means at said user's data processor for receiving said authorization message at said user's data processor and in response thereto, outputting a copy control signal from said user's data processor to said copier to copy said portion of said document on said copier.

30. A data processing system for managing the communicating of pages of a structured document using a communications device in a network, so as to comply with royalty payment requirements of the document, the system comprising:

input means for loading into memory of a user's data processor in said network, a formatted text stream of a structured document which includes a plurality of portions, at least one portion having an associated document portion royalty payment element including a document portion royalty payment amount tag defining a document portion royalty payment amount;

first receiving means coupled to said memory, for receiving a communications command from a user to communicate a portion of said document using a communications device controlled by said user's data processor;

searching means coupled to said input means, for searching said formatted text stream to identify said document portion royalty payment element associated with the portion to be communicated and storing said document portion royalty payment element in a memory in said user's data processor;

first transmitting means coupled to said memory means and responsive to said communications command and to said identified document portion royalty payment element, for transmitting from said user's data processor to a second data processor in said network, a request for authorization to communicate said portion of said document, said request for authorization including said document portion royalty payment amount defined by said document portion royalty payment amount tag;

second receiving means in said second data processor, for receiving said request at said second data processor and in response thereto, creating a charge of said document portion royalty payment amount to an account of said user;

second transmitting means coupled to said second receiving means for transmitting from said second data processor to said user's data processor an authorization message for communicating said portion of said document;

authorization receiving means at said user's data processor, for receiving said authorization message at said user's data processor and in response thereto, outputting a communications control signal from said user's data processor to said communications device, controlled by said user's data processor, to communicate said portion of said document on said communications device.

* * * * *